United States Patent
Cooper et al.

(10) Patent No.: US 10,633,965 B2
(45) Date of Patent: Apr. 28, 2020

(54) DAS-BASED DOWNHOLE TOOL ORIENTATION DETERMINATION

(71) Applicants: Daniel Boyd Cooper, Christiansburg, VA (US); Erik N. Lee, Houston, TX (US); Roger Glen Duncan, Christiansburg, VA (US)

(72) Inventors: Daniel Boyd Cooper, Christiansburg, VA (US); Erik N. Lee, Houston, TX (US); Roger Glen Duncan, Christiansburg, VA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 802 days.

(21) Appl. No.: 14/492,857

(22) Filed: Sep. 22, 2014

(65) Prior Publication Data

US 2016/0084074 A1    Mar. 24, 2016

(51) Int. Cl.
| | | |
|---|---|---|
| *G01V 1/40* | (2006.01) | |
| *G01V 3/18* | (2006.01) | |
| *G01V 5/04* | (2006.01) | |
| *E21B 47/09* | (2012.01) | |
| *G01B 11/00* | (2006.01) | |
| *E21B 47/10* | (2012.01) | |
| *E21B 47/12* | (2012.01) | |

(52) U.S. Cl.
CPC .......... *E21B 47/09* (2013.01); *E21B 47/101* (2013.01); *E21B 47/123* (2013.01); *G01B 11/00* (2013.01)

(58) Field of Classification Search
CPC ...... E21B 47/09; E21B 47/101; E21B 47/123; G01B 11/00

USPC .......................................................... 702/8
See application file for complete search history.

(56) References Cited

U.S. PATENT DOCUMENTS

| | | | |
|---|---|---|---|
| 6,378,607 B1 | 4/2002 | Ryan et al. | |
| 9,810,809 B2 * | 11/2017 | Farhadiroushan | ... G01V 11/005 |
| 2003/0205428 A1 * | 11/2003 | Chang | .................... G01V 1/143 |
| | | | 181/108 |

(Continued)

FOREIGN PATENT DOCUMENTS

| | | | |
|---|---|---|---|
| GB | 2522654 | * | 8/2015 |
| WO | WO 2013/030555 | * | 3/2013 |

OTHER PUBLICATIONS

Definition of Standing Wave, The Physics Classroom, 1996-2016.*

(Continued)

*Primary Examiner* — Michael P Nghiem
(74) *Attorney, Agent, or Firm* — Cantor Colburn LLP

(57) ABSTRACT

A downhole tool orientation determination system to determine a radial orientation of a tool conveyed downhole into a pipe via a carrier and a method of determining a radial orientation of a tool conveyed downhole into a pipe via a carrier are described. The system includes an orientation tool conveyed downhole by the carrier that conveys the tool, and a distributed acoustic sensor (DAS). The DAS includes an optical fiber disposed axially along an outer surface of the pipe; and a processor to determine an orientation of the orientation tool with respect to the optical fiber based on a measurement by the optical fiber at different rotational positions of the orientation tool. The processor determines the radial orientation of the tool with respect to the optical fiber based on the orientation of the orientation tool with respect to the optical fiber.

14 Claims, 9 Drawing Sheets

(56) References Cited

U.S. PATENT DOCUMENTS

| | | | |
|---|---|---|---|
| 2006/0191683 A1* | 8/2006 | Fukuhara | G01N 25/18 |
| | | | 166/250.01 |
| 2007/0211572 A1* | 9/2007 | Reiderman | B06B 1/04 |
| | | | 367/35 |
| 2008/0047337 A1* | 2/2008 | Chemali | E21B 47/101 |
| | | | 73/152.19 |
| 2008/0149416 A1* | 6/2008 | Coates | G01V 1/02 |
| | | | 181/121 |
| 2009/0200021 A1 | 8/2009 | Pinto et al. | |
| 2010/0107754 A1* | 5/2010 | Hartog | E21B 47/101 |
| | | | 73/152.47 |
| 2011/0192222 A1* | 8/2011 | Vetter | E21B 47/0005 |
| | | | 73/152.58 |
| 2012/0069705 A1* | 3/2012 | Zhao | E21B 47/0005 |
| | | | 367/35 |
| 2012/0205154 A1 | 8/2012 | Lozinsky et al. | |
| 2013/0329522 A1* | 12/2013 | Skinner | E21B 43/119 |
| | | | 367/25 |
| 2014/0208843 A1 | 7/2014 | Godfrey | |
| 2016/0349403 A1* | 12/2016 | Farhadiroushan | G01V 11/005 |
| 2017/0211381 A1* | 7/2017 | Chemali | E21B 49/00 |

OTHER PUBLICATIONS

International Preliminary Report on Patentability for PCT Application No. PCT/US2015/044953, dated Apr. 6, 2017, pp. 1-11.
Blount et al., "Perforating Instrumented and Smart Well Completions: Available Technology, Testing, Development, and Lessons Learned", SPE 166369, 2013, pp. 1-10.
Cannon et al., "Distributed Acoustic Sensing: State of the Art", SPE 163688, 2013, pp. 1-10.

* cited by examiner

US 10,633,965 B2

DAS-BASED DOWNHOLE TOOL ORIENTATION DETERMINATION

BACKGROUND

Downhole exploration and production efforts require the introduction of various tools (e.g., sensors, drilling components, processors) into the downhole environment. As a tool is lowered by a carrier (e.g., drill string, armored wireline), the tool may spin and lose original radial alignment with the borehole. That is, a tool with a given side facing north while at the surface may have spun such that the same side is facing east at a certain depth and then facing south at another depth. As a result, once a tool reaches its destination depth, the orientation of the tool is likely different from its orientation at the surface and is not easily discernable. Based on the nature and use of the tool, the orientation may not be relevant.

SUMMARY

According to an embodiment, a downhole tool orientation determination system to determine a radial orientation of a tool conveyed downhole into a pipe via a carrier includes an orientation tool conveyed downhole by the carrier that conveys the tool; and a distributed acoustic sensor (DAS) including an optical fiber disposed axially along an outer surface of the pipe; and a processor configured to determine an orientation of the orientation tool with respect to the optical fiber based on a measurement by the optical fiber at different rotational positions of the orientation tool, wherein the processor determines the radial orientation of the tool with respect to the optical fiber based on the orientation of the orientation tool with respect to the optical fiber.

According to another embodiment, a method of determining a radial orientation of a tool conveyed downhole into a pipe via a carrier includes conveying an orientation tool downhole via the carrier that conveys the tool; disposing an optical fiber axially along an outer surface of the pipe, the optical fiber being a measurement portion of a distributed acoustic sensor (DAS); processing, by a processor, a measurement by the optical fiber at different rotational positions of the orientation tool to determine an orientation of the orientation tool with respect to the optical fiber; and determining the radial orientation of the tool with respect to the optical fiber based on the orientation of the orientation tool with respect to the optical fiber.

BRIEF DESCRIPTION OF THE DRAWINGS

Referring now to the drawings wherein like elements are numbered alike in the several Figures.

DETAILED DESCRIPTION

As noted above, in many cases, the orientation of tools lowered into a borehole may not be known. Based on the nature and use of the tool, the orientation may not be relevant. However, under certain circumstances, knowledge of the orientation may be important. An exemplary situation discussed herein is the use of a perforation tool in a production well. In this exemplary situation, relative orientation must be known so that the perforation tool does not inadvertently perforate optical fiber that is run along an outer surface of the production tubing or casing. In this case, information about the orientation of the perforation tool and, on that basis, the relative orientation with the fiber are both desirable. Embodiments of the systems and methods discussed herein relate to determining the orientation of a downhole tool.

Figure 1:
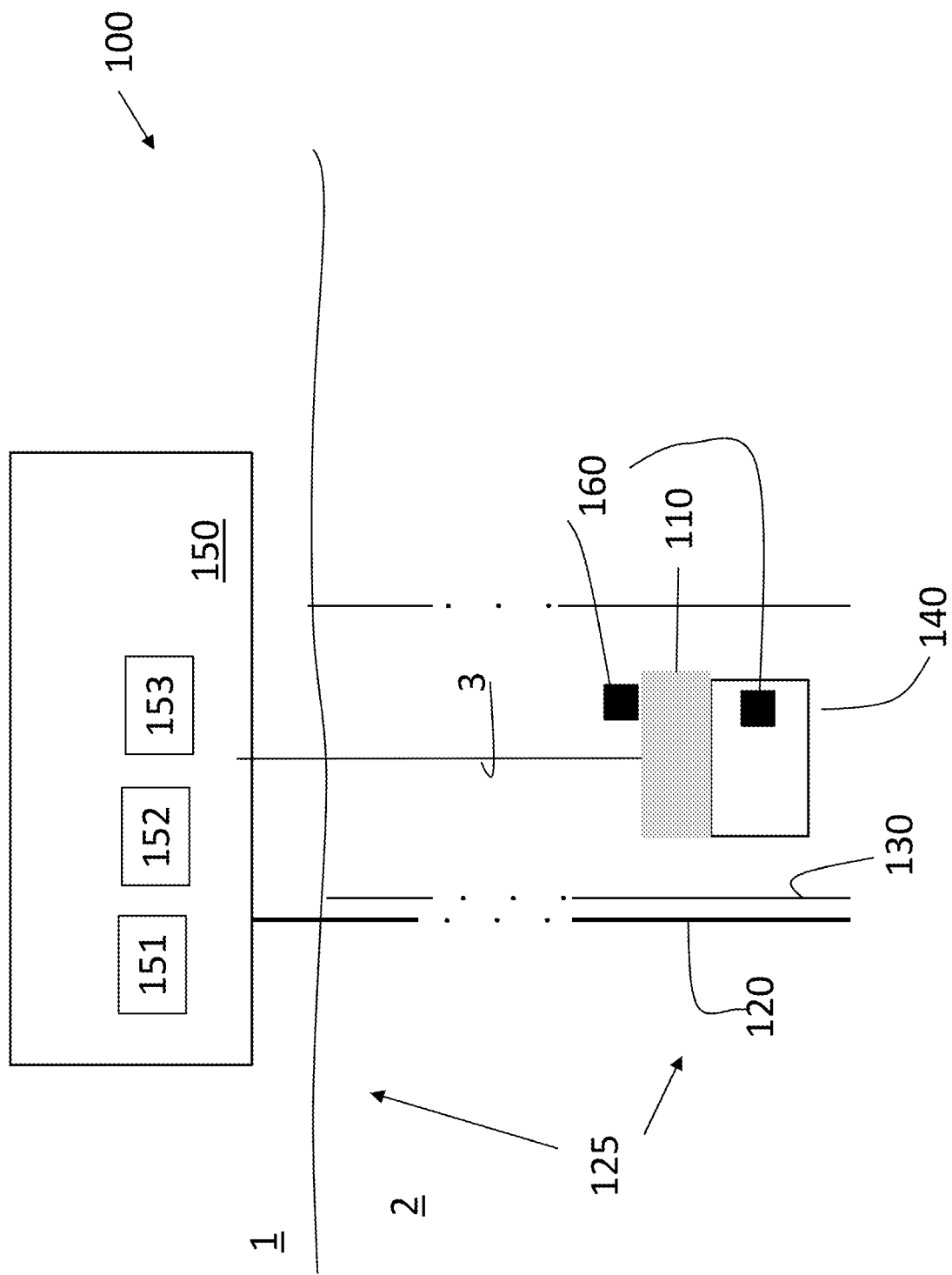
FIG. 1 is a cross-sectional view of aspects of a downhole system according to embodiments of the invention.

FIG. 1 is a cross-sectional view of aspects of a downhole system 100 according to embodiments of the invention. A production tubing or casing 130 is shown extending into a downhole 2 environment (e.g., into the earth). While the production tubing or casing 130 is shown in a vertical well in FIG. 1, the well may instead be a lateral well or have both horizontal and vertical portions. A carrier 3 (e.g., armored wireline) is used to convey one or more tools 140 downhole. One of the tools 140 may be, for example, a perforation tool such that knowledge of a radial orientation of the perforation tool ensures its proper use. An optical fiber 120 is disposed outside the production tubing or casing 130. While the optical fiber 120 is shown separated from the production tubing or casing 130 for clarity, the optical fiber 120 is disposed on the outer surface and may be cemented in to prevent damage to the optical fiber 120. The optical fiber 120 may be part of a distributed acoustic sensing (DAS) system 125 that additionally includes a light source 151 and one or more processors 152 that implement instructions stored in one or more memory devices 153. As shown in FIG. 1, the light source 151, processor 152, and memory device 153 may be part of a surface system 150 (located on the surface 1) that also includes other components associated with the production effort. While the surface system 150 is shown with a single housing, the components of the surface system 150 may be housed and located separately from each other in alternate embodiments. That is, the surface system 150 may include processors 152 additional to or separate from the DAS system 125 to determine tool 140 orientation based on the DAS system 125 output. Some of the components may be distributed between the downhole 2 and surface 1 environments. FIG. 1 additionally indicates an orientation tool 110. Both the orientation tool 110 and the tool 140 may be coupled to a compass 160, according to one embodiment, such that the orientation of the orientation tool 110 and tool 140 with respect to magnetic north is known. Different embodiments of the orientation tool 110 are detailed below.

Figure 2:
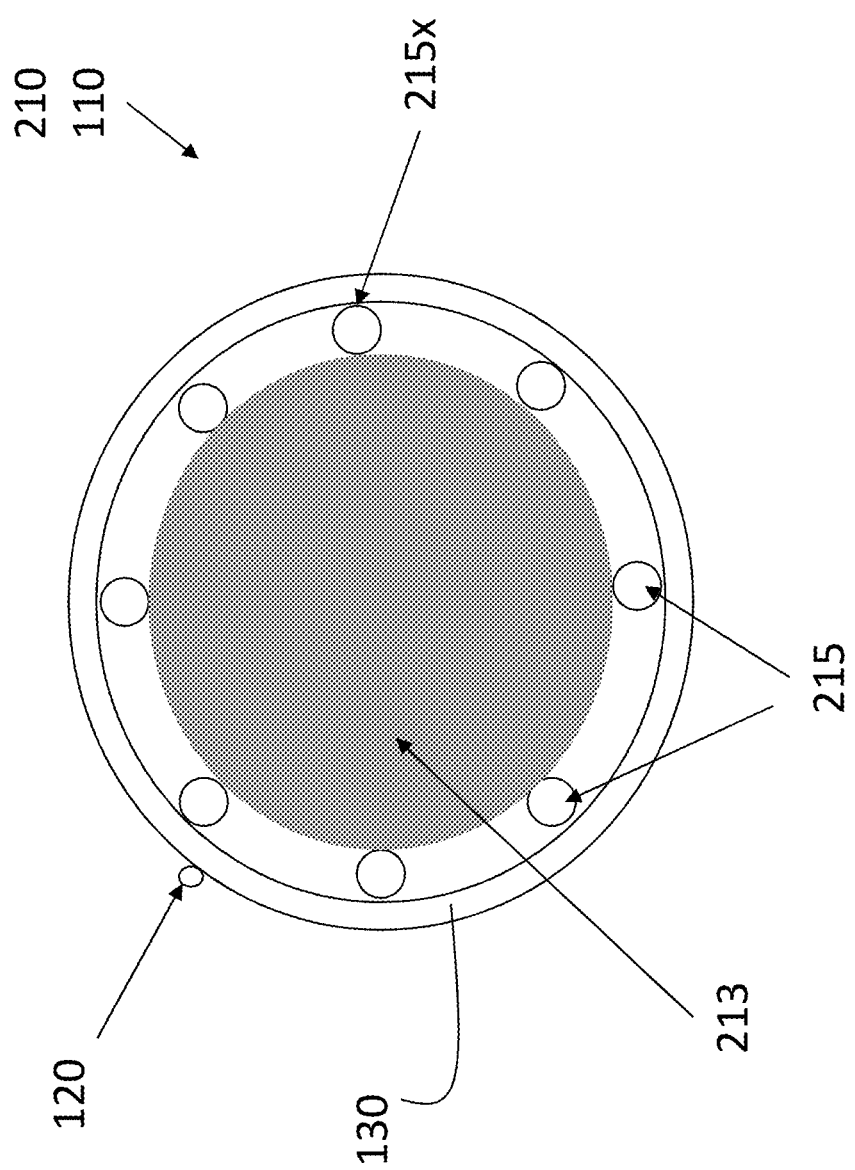
FIG. 2 is perspective top-down cross sectional view of an orientation tool according to one embodiment.

FIG. 2 is perspective top-down cross sectional view of an orientation tool 110 according to one embodiment. The orientation tool 110 according to this embodiment is a multi-transducer tool 210. The multi-transducer tool 210 includes a plurality of mechanical exciters or transducers 215 arranged at a perimeter of a tool body 213. As shown in FIG. 2, the tool body 213 may include a cylindrical body such that the cross sectional shape is circular. At least three transducers 215 may be arranged at the perimeter of the tool body 213. The transducers 215 are designed to (mechanically) impedance match with the walls of the surrounding production tubing or casing 130 and thereby excite vibration therein. The transducers 215 may be greater than 1 meter (m) (e.g., 10 m) in length such that elements of the production tubing or casing 130 may be considered as two-dimensional sections in plane strain (axial propagation of vibration is limited based on the length of the transducers 215). As a result, only two-dimensional cross-sectional modes of the surrounding production tubing or casing 130 may be considered in the design of the multi-transducer tool 210. Plane strain refers to the strain field not having a component along the length of the production tubing or casing 130. This occurs due to an identical stress state (without axial loading) over a long length of the production tubing or casing 130.

As FIG. 2 indicates, the transducers 215 are disposed to excite vibration in the production tubing or casing 130 and the optical fiber 120 is disposed against the outer surface of the production tubing or casing 130 such that the DAS system 125 may sense the resulting strain. By defining a transfer function between a given transducer 215 and points along the production tubing or casing 130, the vibration response at a given angle θ between the surface location of the production tubing or casing 130 where the optical fiber 120 is disposed and the given transducer 215 is given by:

$$a(\theta, f) = H(\theta, f) s(f) \quad [\text{EQ. 1}]$$

In EQ. 1, f is the frequency of excitation, a represents the response measured by the DAS system 125. H represents the transfer function between the given exciter (the transducer 215) and the location outside the production tubing or casing 130 where the optical fiber 120 is located, and s represents amplitude of the excitation applied by the given exciter. The given transducer 215 may be transducer 215x shown in FIG. 2. The orientation of each transducer 215 relative to the tool 140 (e.g., perforation gun) may be known. In alternate or additional embodiments, as noted above, the orientation of each transducer 215 relative to magnetic north is known based on a compass 160.

Figure 3:
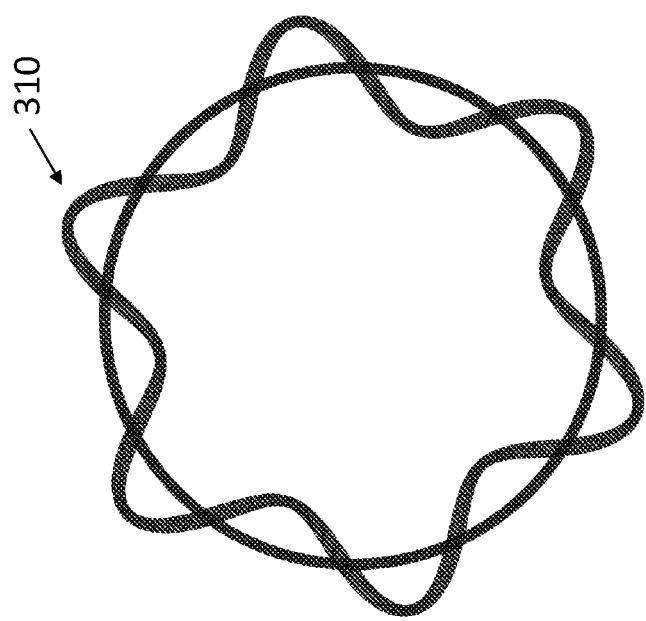
FIG. 3 illustrates an exemplary response obtained by the DAS system according to an embodiment of the invention.

FIG. 3 illustrates an exemplary response obtained by the DAS system 125 according to an embodiment of the invention. The production tubing or casing 130 resulting in the mode shape (response 310) of FIG. 3 is a 6 inch diameter steel pipe excited with fat approximately 2 kilo Hertz (kHz). Because the multi-transducer tool 210 includes multiple exciters (transducers 215), the response at a series of points defined on the production tubing or casing 130 may be represented as:

$$\vec{a}(f) = H(f) \vec{s}(f) \quad [\text{EQ. 2}]$$

EQ. 2 represents a linear system or algebraic system of equations. By defining the response to be high at a single location and zero elsewhere (e.g., response is high when the given transducer 215 (transducer 215x, for example) is closest to the optical fiber 120 of the DAS system 125), the response may be monitored to determine when the given transducer 215 (e.g., transducer 215x) is closest to the optical fiber 120. In practical terms, the frequency of the applied vibration must be sufficiently higher than the fundamental resonance of the production tubing or casing 130. That is, the multi-transducer tool 210 determines orientation based on rotating the tool body 213 (and coupled transducers 215) until a maximum response is indicated by the DAS system 125. Rotation of the tool body 213 or the transducers 215 around the tool body 213 may be achieved in a number of ways including, but not limited to, the multi-transducer tool 210 controlling the rotation based on a control signal from a component of the surface system 150, for example.

Once it is determined, based on monitoring the response by the DAS system 125, that the given transducer 215 (e.g., transducer 215x) is closest to the optical fiber 120, the orientation of the tool 140 may be determined in one of two ways. According to one embodiment, the orientation tool 110 (multi-transducer tool 210) is coupled to the tool 140 such that the orientation of the tool 140 relative to the optical fiber 120 is known because the orientation of the multi-transducer tool 210 relative to the optical fiber 120 is determined. That is, when a maximum response is obtained by the DAS system 125, the position of the given transducer 215 with respect to the optical fiber 120 is known and the corresponding position of the tool 140 is also known. According to another embodiment, the orientation of the multi-transducer tool 210 relative to magnetic north is known (via compass 160) and used to determine position of the optical fiber 120 relative to magnetic north, and orientation of the tool 140 relative to magnetic north is also known (via a compass 160) such that the orientation of the tool 140 with respect to the optical fiber 120 may be determined. That is, the position of the optical fiber 120 relative to magnetic north is known based on knowing the orientation of the multi-transducer tool 210 with respect to magnetic north and determining the relative orientation between the multi-transducer tool 210 and the optical fiber 120 based on the DAS system 125 measured response. When this information is coupled with knowledge of the tool 140 orientation with respect to magnetic north (based on another compass 160 coupled to the tool 140), the orientation of the optical fiber 120 with respect to the tool 140 is determined. When the tool 140 is moved in depth, the process of determining orientation may have to be repeated. This is not only because the tool 140 orientation may have changed but also because the optical fiber 120 may have moved relative to the production tubing or casing 130 based on depth.

Figure 4:
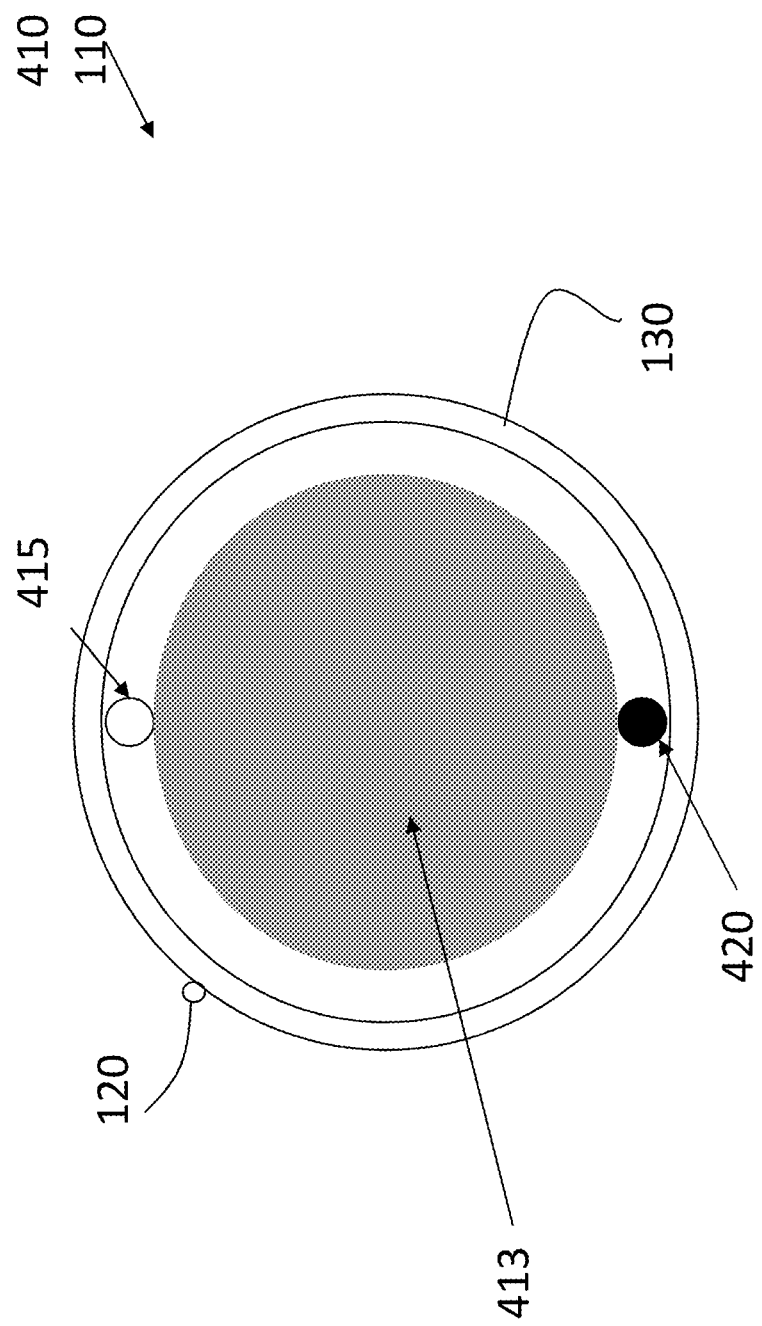
FIG. 4 is perspective top-down cross sectional view of an orientation tool according to another embodiment.

FIG. 4 is perspective top-down cross sectional view of an orientation tool 110 according to another embodiment. The orientation tool 110 according to this embodiment is a single-transducer tool 410. In a similar manner to the multi-transducer tool 210, the single-transducer tool 410 may be coupled to the tool 140 to be oriented or may include a compass 160 such that orientation with reference to magnetic north is known. As detailed below, the single-transducer tool 410 facilitates locating the orientation of the optical fiber 120 based on a phase delay between a measurement by the DAS system 125 and excitation by the single-transducer tool 410. The single-transducer tool 410 includes a mechanical exciter or transducer 415 arranged at a perimeter of a tool body 413. As shown in FIG. 4, the tool body 413 may be cylindrical with a circular cross sectional shape. The single-transducer tool 410 also includes an impedance matched dampening element 420. As noted above, axial propagation of vibrations may be mitigated by using a long transducer 415. The pulse width of the DAS system 125 governs the length over which the acoustic measurement is averaged.

Vibrations from a given excitation propagate in both positive (counter-clockwise, as shown in FIG. 4) and negative (clockwise, as shown in FIG. 4) senses, giving rise to standing waves over the circumference of the production tubing or casing 130. However, with the impedance matched dampening element 420 arranged opposite the transducer 415 as shown in FIG. 4, the impedance matched dampening element 420 decouples the positive and negative propagating vibrations so that the standing waves do not arise. In the absence of standing waves, time-of-flight based measurements are practicable. Thus, for a sufficiently low frequency vibration, the phase delay between the DAS system 125 measurement and the excitation at the transducer 415 may be calculated. By rotating the single-transducer tool 410 until the phase delay is minimized, the downhole orientation may be determined That is, when the minimum phase delay is obtained, the transducer 415 is at its closest point to the optical fiber 120 and, thus, the relative orientation between the single-transducer tool 410 and optical fiber 120 is known. Once the orientation of the single-transducer tool 410 relative to the optical fiber 120 is determined, the orientation of the tool 140 relative to the optical fiber 120 may be determined according to one of the embodiments discussed above with reference to the multi-transducer tool 210. Specifically, orientation of the tool 140 relative to the optical fiber 120 may be determined based on coupling of the single-transducer tool 410 with the tool 140 or a determination of orientation relative to magnetic north based on a compass 160 associated with both the single-transducer tool 410 and the tool 140.

Figure 5:
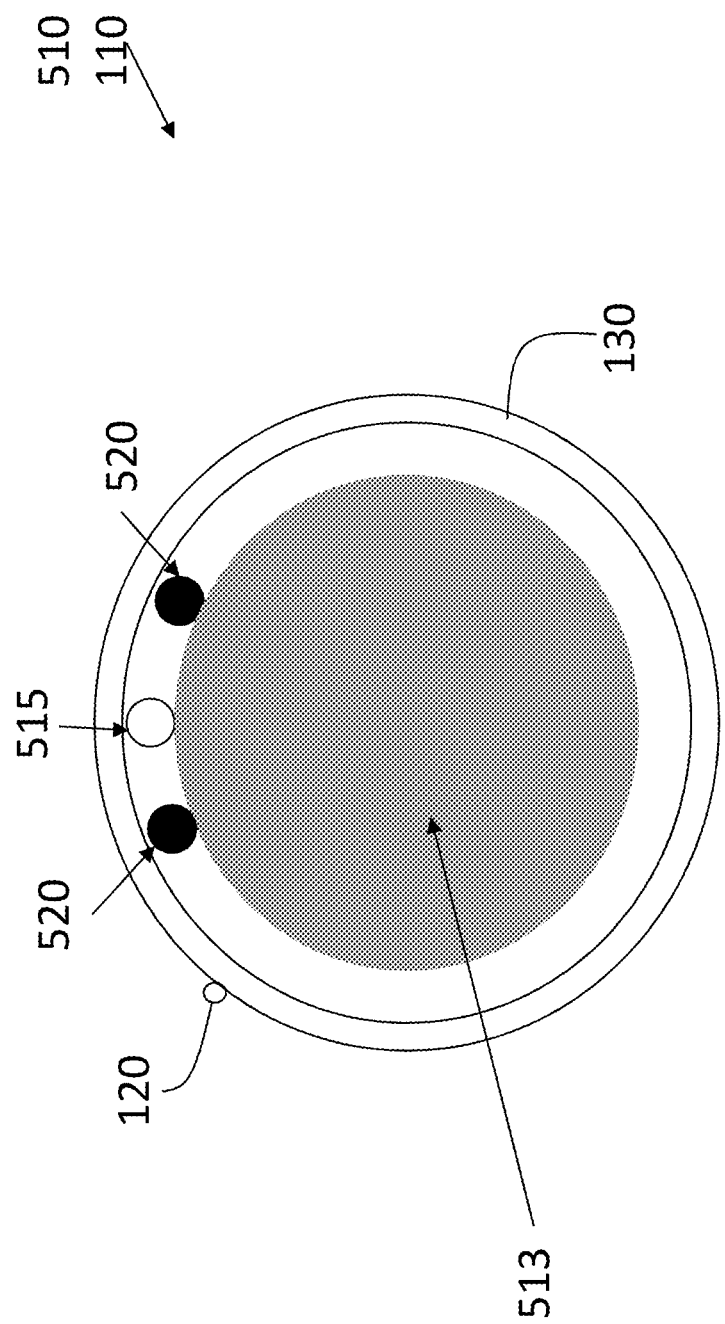
FIG. 5 is a perspective top-down cross sectional view of an orientation tool according to another embodiment.

FIG. 5 is a perspective top-down cross sectional view of an orientation tool 110 according to another embodiment. The orientation tool 110 according to this embodiment is a single-transducer-double-dampening tool 510. The single-transducer-double-dampening tool 510 includes a tool body 513 with a transducer 515 at a perimeter and two impedance matched dampening elements 520 on either side of the transducer 515, as shown in FIG. 5. According to the illustrated arrangement, the two impedance matched dampening elements 520 prevent the excitation generated by the transducer 515 from being propagated past them. That is, the excitation is limited to a location of the production tubing or casing 130 adjacent to the transducer 515 and does not result in the mode shape shown in FIG. 3, for example. As a result, the DAS system 125 does not measure vibration until the single-transducer-double-dampening tool 510 is rotated such that the transducer 515 is on the other side of the production tubing or casing 130 from the optical fiber 120. Once the relative orientation of the single-transducer-double-dampening tool 510 relative to the optical fiber 120 is known, the orientation of the tool 140 relative to the optical fiber 120 may be determined according to one of the embodiments described above. That is, the tool 140 may be coupled to the single-transducer-double-dampening tool 510 or the orientation of the single-transducer-double-dampening tool 510 and the orientation of the tool 140 relative to magnetic north may be known based on a compass 160.

Figure 6:
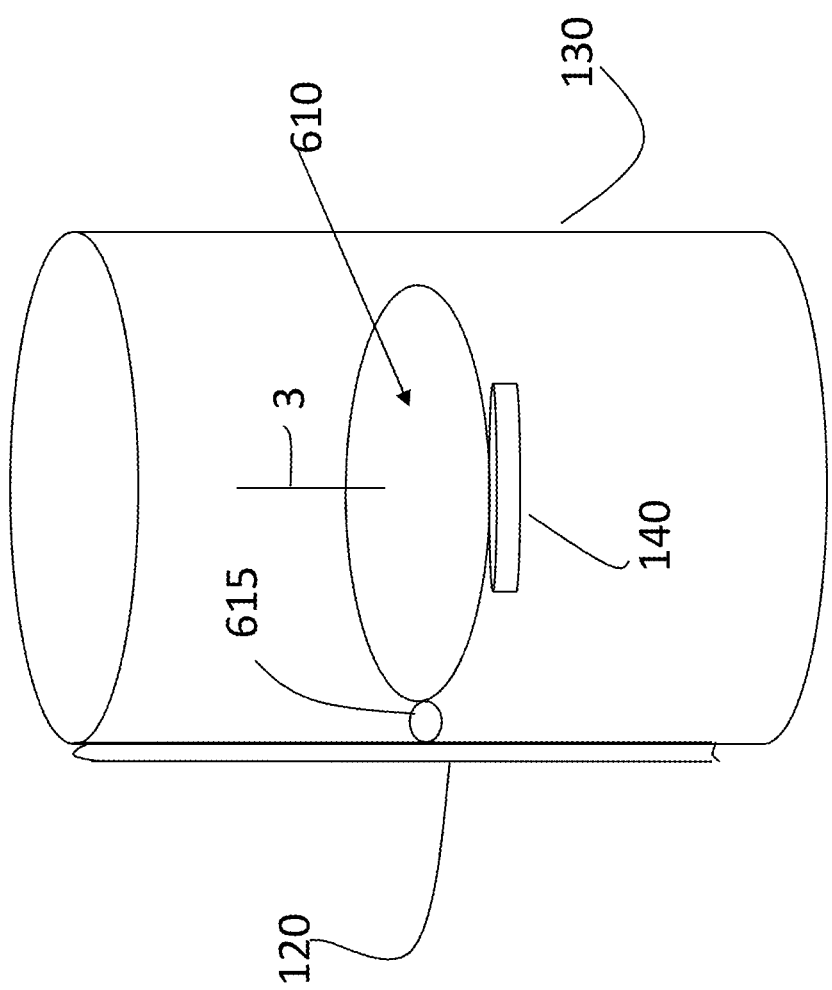
FIG. 6 is a cross sectional view of an orientation tool according to another embodiment.
Figure 7:
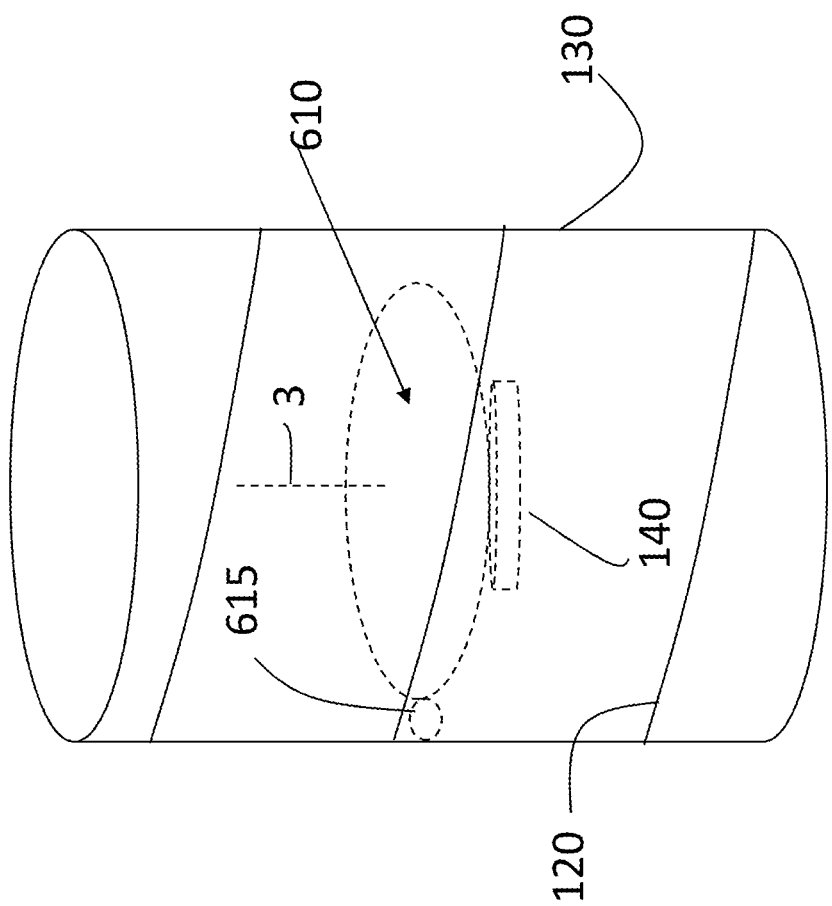
FIG. 7 is a cross sectional view of an orientation tool according to another embodiment.

FIG. 6 is a cross sectional view of an orientation tool 110 according to another embodiment. The orientation tool 110 according to this embodiment is a transducer tool 610 with a transducer 615 acting as an acoustic source to be detected via beam forming methods. Different points along the optical fiber 120 act as a receiver array such that the beam forming provides a three-dimensional relative location of the source (transducer 615) with respect to the receiver array (optical fiber 120). FIG. 7 is a cross sectional view of an orientation tool 110 according to another embodiment. FIG. 7 illustrates an alternate embodiment to the one shown in FIG. 6. Specifically, the optical fiber 120 may be spiraled around the outer surface of the production tubing or casing 130 as shown in FIG. 6. The transducer 615 is rotated and the DAS system 125 takes measurements at different angular locations of the transducer 615. The measurements are used to determine the location of the transducer 615 (acoustic source) with respect to the optical fiber 120. Once this is known, the embodiments discussed above may be used to determine an orientation of the tool 140 with the optical fiber 120.

Figure 8:
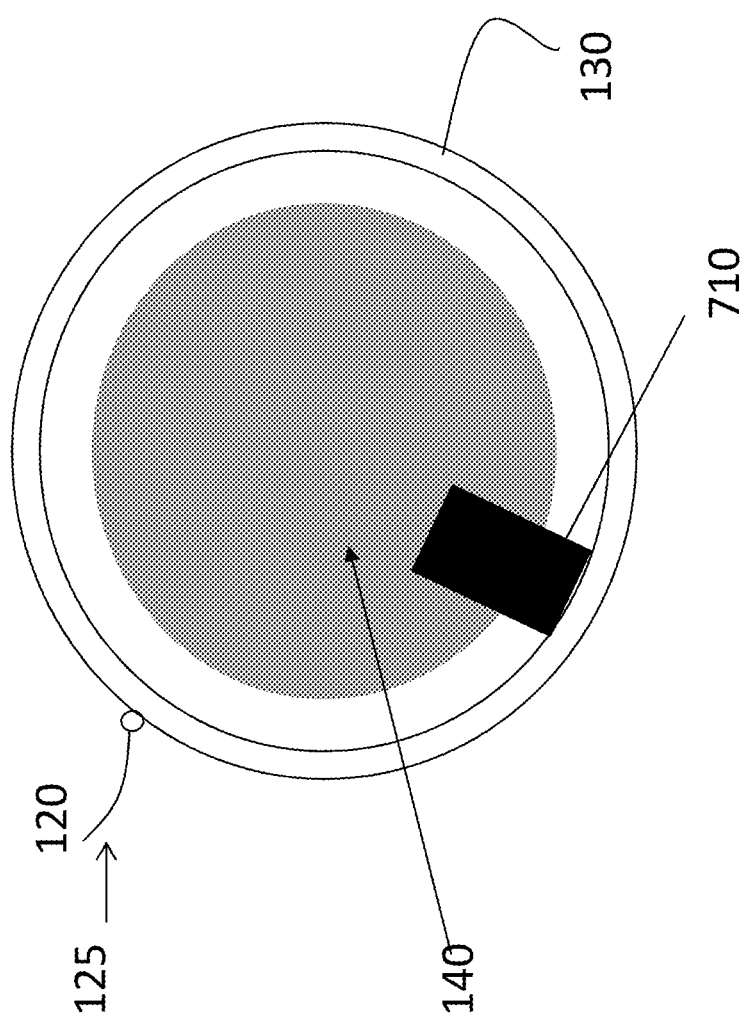
FIG. 8 is a top-down perspective cross sectional view of an orientation tool according to another embodiment.
Figure 9:
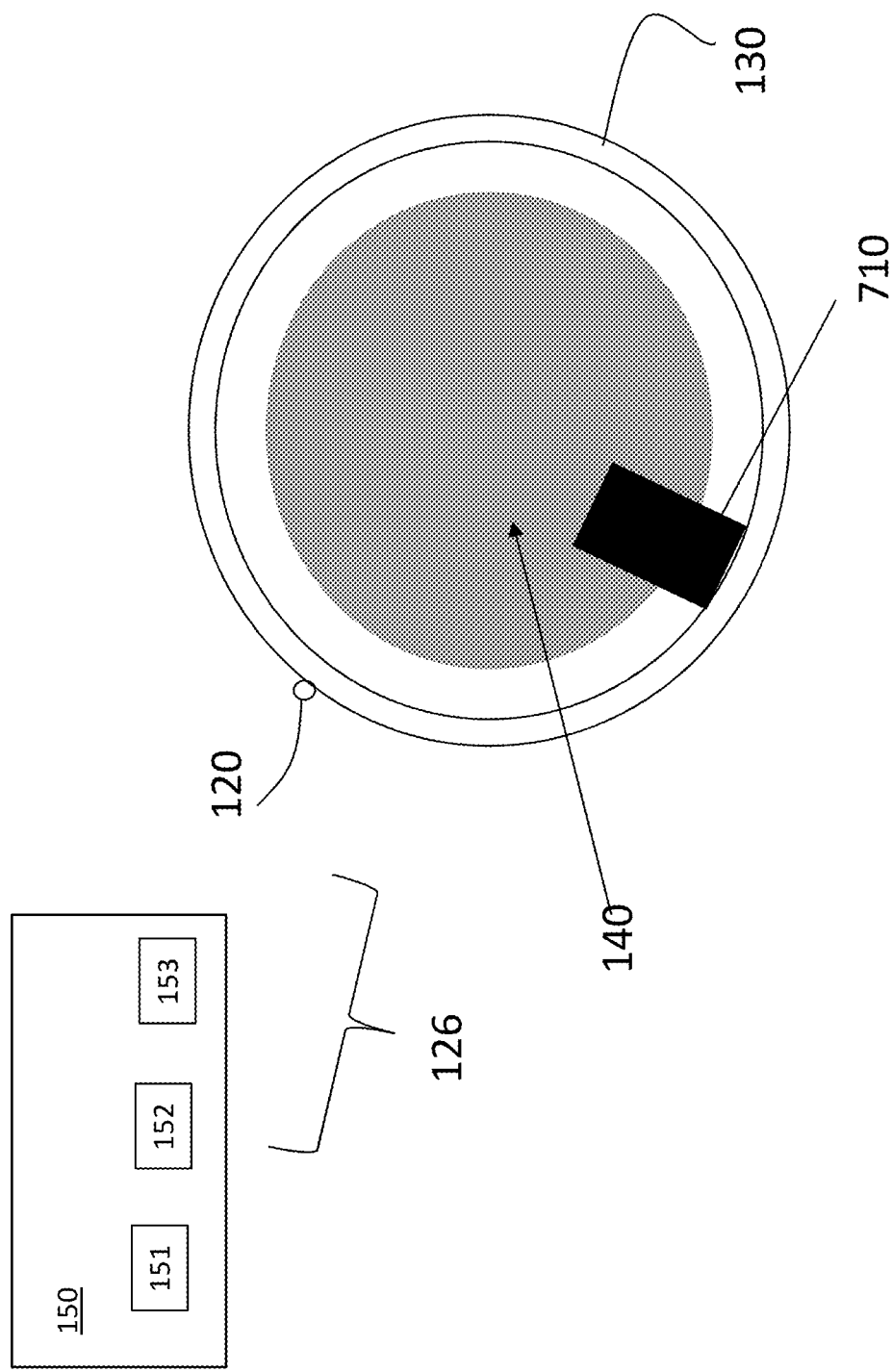
FIG. 9 is a top-down perspective cross sectional view of an orientation tool according to another embodiment.

FIG. 8 is a top-down perspective cross sectional view of an orientation tool 110 according to another embodiment. The orientation tool 110 according to this embodiment is a heating element 710. As shown in FIG. 7, the heating element 710 is disposed on the tool 140 at a known angular orientation of the tool and extends such that the heating element 710 contacts the inner wall of the production tubing or casing 130. The DAS system 125 can detect a transient thermal event. The tool 140 (with the heating element 710 on it) is rotated until the DAS system 125 detects maximum thermal signals. This condition would indicate that the heating element 710 is on the opposite side of the production tubing or casing 130 from the optical fiber 120. Accordingly, the orientation of the tool 140 relative to the optical fiber 120 would be known. FIG. 9 is a top-down perspective cross sectional view of an orientation tool 110 according to another embodiment. According to the alternate embodiment shown in FIG. 9, the optical fiber 120 may be part of a distributed temperature sensing (DTS) system 126 rather than a DAS system 125 based on the light source 151 interrogating the optical fiber 120 differently and the processor 152 processing the reflections differently than in the DAS system 125.

As noted above, when the tool 140 is a perforation tool, for example, knowing the relative orientation between the tool 140 and optical fiber 120 would prevent perforation of the optical fiber 120 with the tool 140, for example. In other embodiments, by knowing the relative orientation between the tool 140 and the optical fiber 120 (and having knowledge of the radial position of the optical fiber 120 with respect to the production tubing or casing 130), the radial orientation of the tool 140 within the production tubing or casing 130 is known. This information may be used to target or avoid some portion of the production tubing or casing 130 with the tool 140, which may not be a perforation tool but, instead, a sensor or measurement device, for example.

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A downhole tool orientation determination system to determine a radial orientation of a tool conveyed downhole into a pipe via a carrier, the system comprising:
    an orientation tool conveyed downhole by the carrier that conveys the tool; and
    a distributed acoustic sensor (DAS) comprising
        an optical fiber disposed axially along an outer surface of the pipe; and
        a processor configured to determine a rotational position of the orientation tool with respect to the optical fiber based on measurements by the optical fiber at different rotational positions of the orientation tool, wherein the processor determines the radial orientation of the tool with respect to the optical fiber based on the rotational position of the orientation tool with respect to the optical fiber based on a fixed rotational relationship between the tool and the orientation tool, wherein the orientation tool includes a first transducer and the processor determines that the first transducer is at a closest position to the optical fiber among different positions of the first transducer based on the different rotational positions of the orientation tool when a phase delay between a measurement by the DAS and excitation by the first transducer is a lowest phase delay value among phase delay values obtained for the different rotational positions of the orientation tool, wherein operation of the tool is controlled based on the radial orientation determined by the processor.

2. The system according to claim 1, wherein the orientation tool includes the first transducer and the system further comprises an impedance matched dampening element arranged to prevent a standing wave in the pipe based on excitation by the first transducer.

3. The system according to claim 2, wherein the processor determines the rotational position of the orientation tool with respect to the optical fiber based on determining a phase delay between an excitation of the first transducer and the measurements by the optical fiber at the different rotational positions of the orientation tool.

4. The system according to claim 1, wherein the orientation tool includes the first transducer and the processor determines the orientation of the first transducer of the orientation tool with respect to the optical fiber based on beam forming techniques.

5. The system according to claim 1, wherein the orientation tool includes the first transducer and the system further comprises additional transducers arranged radially on the orientation tool and in contact with the pipe.

6. The system according to claim 5, wherein the measurements by the optical fiber at the different rotational positions of the orientation tool is a response based on vibration excitation generated by the first transducer and the additional transducers, the first transducer providing greater vibration excitation than the additional transducers.

7. The system according to claim 6, wherein the processor determines that the first transducer is at a closest position to the optical fiber among different positions of the first transducer based on the different rotational positions of the orientation tool when the response is a maximum response value obtained for the different rotational positions of the orientation tool.

8. The system according to claim 1, wherein the processor determines the radial orientation of the tool with respect to the optical fiber based on the orientation tool being physically attached to the tool.

9. The system according to claim 1, further comprising a compass to each of the orientation tool and the tool to determine the orientation of the orientation tool and the orientation of the tool with respect to magnetic north, wherein the processor determines the radial orientation of the tool with respect to the optical fiber based on determining a position of the optical fiber with respect to the magnetic north which is determined based on the orientation tool.

10. A method of determining a radial orientation of a tool conveyed downhole into a pipe via a carrier, the method comprising:
conveying an orientation tool downhole via the carrier that conveys the tool;
disposing an optical fiber axially along an outer surface of the pipe, the optical fiber being a measurement portion of a distributed acoustic sensor (DAS);
processing, by a processor, measurements by the optical fiber at different rotational positions of the orientation tool to determine a rotational position of the orientation tool with respect to the optical fiber;
determining the radial orientation of the tool with respect to the optical fiber based on the orientation of the orientation tool with respect to the optical fiber based on a fixed rotational relationship between the tool and the orientation tool, wherein the orientation tool includes a first transducer or a heating element in contact with an inner surface of the pipe, wherein the determining the radial orientation of the tool with respect to the optical fiber based on the rotational position of the orientation tool with respect to the optical fiber includes determining that the first transducer is at a closest position among different positions of the first transducer based on the different rotational positions of the orientation tool to the optical fiber when a phase delay between a measurement by the DAS and excitation by the first transducer is a lowest phase delay value among phase delay values obtained for the different rotational positions of the orientation tool; and
controlling an operation of the tool based on the radial orientation of the tool.

11. The method according to claim 10, wherein the orientation tool includes the first transducer and an impedance matched dampening element to prevent a standing wave in the pipe based on excitation by the first transducer, and the processing the measurements includes determining a phase delay between the excitation by the first transducer and the measurements by the optical fiber at the different rotational positions of the orientation tool.

12. The method according to claim 10, wherein the orientation tool includes the first transducer and the determining the radial orientation of the tool with respect to the optical fiber based on the rotational position of the orientation tool with respect to the optical fiber includes determining the orientation of the first transducer of the orientation tool with respect to the optical fiber based on beam forming techniques.

13. The method according to claim 10, wherein the orientation tool includes the first transducer and additional transducers arranged radially on the orientation tool and in contact with the pipe, the processing the measurements includes processing a response based on vibration excitation generated by the first transducer and the additional transducers, the first transducer providing greater vibration excitation than the additional transducers, and determining the rotational position of the orientation tool includes determining that the first transducer is at a closest position to the optical fiber among different positions of the first transducer based on the different rotational positions of the orientation tool when the response is a maximum response value obtained for the different rotational positions of the orientation tool.

14. The method according to claim 10, wherein the determining the radial orientation of the tool with respect to the optical fiber is based on the orientation tool being physically attached to the tool or on a knowledge of the orientation of the orientation tool and the orientation of the tool with respect to magnetic north such that the determining the radial orientation of the tool with respect to the optical fiber is based on determining a position of the optical fiber with respect to the magnetic north based on the orientation tool.

* * * * *